US 8,827,152 B2

(12) United States Patent
Ross et al.

(10) Patent No.: US 8,827,152 B2
(45) Date of Patent: Sep. 9, 2014

(54) SELF-SERVICE TERMINAL

(75) Inventors: Gary A. Ross, Fife (GB); Simon J. Forrest, Dundee (GB)

(73) Assignee: NCR Corporation, Duluth, GA (US)

( * ) Notice: Subject to any disclaimer, the term of this patent is extended or adjusted under 35 U.S.C. 154(b) by 500 days.

(21) Appl. No.: 12/957,578

(22) Filed: Dec. 1, 2010

(65) Prior Publication Data
US 2011/0068169 A1 Mar. 24, 2011

Related U.S. Application Data

(62) Division of application No. 10/618,235, filed on Jul. 11, 2003, now Pat. No. 7,856,401.

(51) Int. Cl.
*G07F 19/00* (2006.01)

(52) U.S. Cl.
USPC .......... 235/379; 235/380; 235/381; 235/492; 902/8; 902/26

(58) Field of Classification Search
CPC ... G06Q 40/00; G06Q 30/02; G06Q 30/0251; G06Q 10/087; G06Q 20/341; G06Q 20/1085; B66B 3/00; G07B 15/063; G08G 1/017; Y10S 707/92; G07F 19/20
USPC ............. 902/9, 8, 26; 194/206; 235/379, 375, 235/380, 492, 383, 384
See application file for complete search history.

(56) References Cited

U.S. PATENT DOCUMENTS

| 5,221,838 | A | 6/1993 | Gutman et al. |
| 6,796,496 | B2* | 9/2004 | Andersen et al. ............. 235/380 |
| 7,761,347 | B2* | 7/2010 | Fujisawa et al. ................ 705/28 |
| 2003/0006121 | A1* | 1/2003 | Lee et al. ....................... 194/206 |
| 2003/0057271 | A1 | 3/2003 | Andersen et al. |
| 2003/0144946 | A1 | 7/2003 | Misawa et al. |
| 2005/0150740 | A1* | 7/2005 | Finkenzeller et al. ........ 194/207 |
| 2012/0023018 | A1* | 1/2012 | Carpenter et al. .............. 705/43 |

FOREIGN PATENT DOCUMENTS

WO    WO 03054808 A2 *   7/2003   ............... G07D 7/00

OTHER PUBLICATIONS

Non-Final Office Action for U.S. Appl. No. 10/618,235 mailed Feb. 19, 2010.
Non-Final Office Action for U.S. Appl. No. 10/618,235 mailed Mar. 17, 2009.
Non-Final Office Action for U.S. Appl. No. 10/618,235 mailed Jun. 11, 2008.
Final Office Action for U.S. Appl. No. 10/618,235 mailed Nov. 25, 2008.

* cited by examiner

*Primary Examiner* — Sonji Johnson
(74) *Attorney, Agent, or Firm* — Peter H. Priest

(57) ABSTRACT

A self-service terminal for reading wireless tags incorporated into media items is described. The terminal comprises a media acceptor for receiving media items, such as banknotes incorporating an RFID tag, and a wireless tag reader for reading received media items incorporating wireless tags. The terminal may also include a wireless tag reader for reading wireless tags in media items that are being transported to determine if multiple superimposed media items are present. The terminal may include a wireless tag reader for reading wireless tags in media items presented as a bunch, and subsequently retracted, to determine if any of the presented media items had been removed.

20 Claims, 11 Drawing Sheets

SELF-SERVICE TERMINAL

CROSS REFERENCE TO RELATED APPLICATIONS

This application is a division of U.S. patent application Ser. No. 10/618,235, filed Jul. 11, 2003, which is hereby incorporated by reference.

BACKGROUND OF THE INVENTION

The present invention relates to a self-service terminal, such as an automated teller machine (ATM), for reading wireless tags, such as RFID (radio-frequency identification) tags. In particular, the invention relates to an automated teller machine for reading RFID tags incorporated into banknotes and other valuable media items. The invention also relates to media items incorporating wireless tags.

Self-service terminals are generally public-access devices that are designed to allow a user to conduct a transaction or to access information in an unassisted manner and/or in an unattended environment. SSTs typically include some form of tamper resistance (in both hardware and software) so that they are inherently resilient. SSTs include: ATMs; non-cash kiosks that allow users to access information (for example, to view reward points on a reward card the user has inserted into the SST); and kiosks that accept payment for services (for example, Web surfing kiosks, photo printing kiosks, kiosks that allow users to buy goods, and such like). The term SST has a relatively broad meaning and includes vending machines.

An ATM is one type of SST, and typically includes a cash dispenser for dispensing currency to a user subsequent to identifying the user and validating that the user has sufficient funds to cover the amount of currency to be dispensed.

One known type of ATM is typically referred to as a deposit ATM because it is used to receive deposited media items, such as banknotes and/or checks, from a user. Acceptance, validation, and storage of a deposit in a deposit ATM is typically performed by a depository module.

Typical depository modules require a user to input banknotes to be recognized and validated either singly (which is time consuming) or as a bunch that is mechanically separated into individual banknotes for recognition and validation on a banknote by banknote basis.

One problem associated with receiving deposits from a user relates to validating the authenticity of the deposited media in real time as the user deposits the media.

Another problem associated with receiving deposits is the cost and reliability of the depository module because of the electro-mechanical and imaging components within the module.

SUMMARY OF THE INVENTION

It is among the objects of an embodiment of the present invention to obviate or mitigate one or more of the above disadvantages or other disadvantages associated with prior art depository modules, dispenser modules, and such like.

The invention relates generally to an SST including a wireless tag reader for monitoring media items incorporating a wireless tag while the media items are being stored, transported, presented, or deposited.

The invention also relates generally to a media item incorporating a wireless tag.

According to a first aspect of the invention there is provided a self-service terminal comprising a media acceptor, and a wireless tag reader for reading media items incorporating wireless tags and entered via the media acceptor.

The term "tag" is used herein to include: a device that actively transmits information to a reader (for example, a transponder); and also a device that passively transmits information to a reader (for example, a device that transmits information by reflecting and modulating a signal received from a reader).

A tag is incorporated into a media item and is encoded with information relating to the media item. For example, a tag incorporated into a ten dollar banknote may include the value of the banknote (ten dollars), and serial number of the banknote, the date the banknote was printed, and such like information. Every tag stores a unique identification code, so that no two tags have the same identification code. By 2005, the European Central Bank intends to incorporate wireless tags into Euro banknotes.

A tag may be read only, write once read many times, volatile read/write, or such like.

The term "wireless tag reader" is used herein to include apparatus that has those elements required to obtain stored information from a tag, such as an antenna to transmit signals, a transceiver to generate signals and receive signals, and a decoder to decode the signals received by the transceiver.

The media acceptor may be a check processing module (CPM), a currency recycling module, a bunch banknote acceptor module, or such like.

The terminal may include a temporary storage facility incorporating the wireless tag reader, where the temporary storage facility is operable to return its contents to a user at the terminal if a deposit transaction is cancelled after the media items are inserted.

The terminal may include a second storage facility for receiving the contents of the temporary storage facility when a transaction is accepted by the user.

The wireless tag reader may be incorporated into the temporary storage facility. A depository module may be provided including the temporary storage facility, the second storage facility, and the wireless tag reader. This has the advantage that a single depository module could be provided for incorporating into a self-service terminal.

The temporary storage facility may be relatively simple, such as a sliding drawer. Alternatively, the temporary storage facility may be an escrow area to which media items are transported.

The terminal may include further means for analyzing the media item. Such further means may include an imager for imaging the media item to read any information printed or otherwise applied to the media item. The imager may be used to correlate information printed on the media item with information stored within the tag embedded in the media item. The further means may comprise a security feature reader for detecting the presence of a security feature, such as a watermark, hidden ink, a fluorescence feature, or such like. Including such further means is undesirable for some depository modules because it increases the cost and complexity of the module. However, for those applications where validating a media item is exceptionally important, it may be advantageous to include the further means for analyzing a media item.

According to a second aspect of the invention there is provided a method of operating a self-service terminal, the method comprising: receiving a media item from a user; detecting a wireless tag incorporated within the media item; reading data from the wireless tag; and presenting the read data to the user for acceptance by the user.

The method may include the further steps of receiving the user's response to the presented data; and either returning the media item to the user in the event that the user wishes to cancel the transaction, or storing the media item in the event the user wishes to proceed with the transaction.

The method may include the further step of associating the identity of the user with the wireless tags in the media items deposited. This enables the owner of the terminal to trace any user who deposited invalid media items, for example, counterfeit media items.

The method may include the further steps of removing the deposited media items from the terminal; validating the media items; and tracing the depositor of any media item that is not validated.

It will be appreciated that a bunch of media items may be entered simultaneously, as each wireless tag has its own unique identifier and all of the tags can be read without separating the media items. The media items may be disparate types, for example, a ten dollar bill, a twenty dollar bill, and a check.

It will now be appreciated that the first and second aspects of the present invention have the advantage that a simple depository module may be provided that does not require a complex electro-mechanical transport, imaging optics, or such like. Furthermore, it is not necessary to separate a bunch of received media items into individual items for individual processing. A depository module according to these aspects of the present invention could be used in a similar manner to a night safe, where a user deposits a package in a bin. All media items are read by the wireless tag reader without requiring any physical separation of the media items.

The value of the deposited media items is displayed to the depositor who can decide to accept or reject the deposit. If rejected, the bundle is returned to the depositor. If accepted the depositor's account can be updated and the bundle of media items dropped (or otherwise moved) into a storage bin. Subsequently the bundle can be sorted mechanically or manually. If there are any anomalies with a deposited media item, then the tag in the media item can be traced to the depositor and appropriate action taken.

These aspects of the invention exploit the advantages offered by wireless tags, such as RFID tags. The electro-mechanical apparatus required to perform depositing of media items incorporating RFID tags is much simpler because no movement or separation of the media items is required to validate the media items. Hence the deposit operation can be performed much more quickly, and the terminal has less chance of mechanical failure.

These aspects of the invention relate to RFID tags, or similar wireless tags, for use in a self-service terminal such as an ATM, or in a module for use in a self-service terminal. Such modules include Bunch note accept modules, check processing modules, currency recycling modules, and such like.

According to a third aspect of the present invention there is provided a method of rendering valueless valuable media items having a substrate incorporating a wireless tag, comprising: defacing the substrate while maintaining the integrity of the wireless tag so that the wireless tag may be subsequently read.

The method may include the further step of reading the wireless tags in the valuable media items to determine the value of the media items that have been defaced.

The method may include the further step of relaying to a remote center information about the media items that have been defaced.

According to a fourth aspect of the present invention there is provided a valuable media store including a wireless tag reader for reading a wireless tag incorporated into a substrate of a media item; a tamper detection circuit; and defacing means in operative communication with the tamper detection circuit; whereby in the event of tampering with the valuable media store, the defacing means is operative to deface the substrate without destroying the wireless tag.

The valuable media store may be, for example, a currency cassette or a dispenser.

Any convenient tamper detecting circuitry may be used, such as a circuit including a conducting mesh and a monitor for monitoring the integrity of the mesh to detect if the mesh has been penetrated.

The defacing means may comprise an ink staining mechanism, a resin releasing mechanism for bonding banknotes together, or such like.

By virtue of the third and fourth aspects of the present invention, cash-in-transit vehicles, ATMs, and other systems that employ security devices can be enhanced to ensure that defaced media items become valueless. Currently, attempted unauthorized access to valuable media results in the evacuation of a container of dye to stain the media such that it can be easily identified as media that has undergone that process. It does not render the media unusable and it sometimes fails to comprehensively stain the media. Hence acquiring such media can still be lucrative for a thief and theft of the media is still a large financial loss to the legitimate owner. An alternative, which stops the thief getting the media, involves destroying the media; but the owner then has the problem of proving the value of what has been destroyed. Such a system would be very susceptible to fraud.

One of the advantages of the third and fourth aspects of the invention is that media containing RFID chips can be made unusable by anyone yet its original value can still be ascertained. If a package of currency having banknotes comprising a printed substrate incorporating a wireless tag (such as an RFID chip encapsulated in glass or plastic) was illegally tampered with, the media substrates could be shredded, chemically destroyed/defaced, encased in polymer resin, glued, or such like, without destroying the RFID chips, the RFID chips could subsequently be read to determine the origins and value of the now worthless media items. Although there would be a replacement cost, it would be less than the insurance cost to replace unrecovered stolen currency or the loss of the media.

The third and fourth aspects of the invention prevent any further use of the media items, by unauthorized (or authorized) persons, without the loss of information about the original media items.

According to a fifth aspect of the present invention there is provided a method of improving the security of valuable media items comprising a substrate incorporating a wireless tag, the method comprising: reading a unique serial code from the wireless tag; encoding the unique serial code onto the substrate; so that the media item may be validated by comparing the serial code stored in the wireless tag with the serial code encoded on the media substrate.

Preferably, the serial code is a number encoded in machine readable form to facilitate automated reading of both the wireless tag and the serial number.

Preferably, the serial code is derived from a security feature that is difficult to counterfeit, such as a watermark, a fluorescence feature, or a hologram. In such cases, if the serial code stored in the tag matches the code derived from the security feature then there is a high probability that the media item is authentic.

In less preferred embodiments, the serial code may be derived from a bar-code, a printed code, or such like.

According to a sixth aspect of the present invention there is provided a valuable media item comprising a wireless tag and a substrate incorporating the wireless tag, wherein the substrate further includes an encoded representation of a serial number stored within the wireless tag.

Provided the encoded representation is in a form that is not easily copied, this has the advantage that if a wireless tag is removed from a genuine valuable media item and incorporated into a counterfeit media item, then the serial number in the wireless tag will not match the encoded representation of the serial number on the counterfeit media item, thereby enabling the counterfeit media item to be detected. This type of fraudulent activity is analogous to the theft of threads from genuine banknotes and subsequent attachment to counterfeit banknotes. If the entire serial number is in the wireless tag, and that is all that is read by a validation machine, then it would not be possible to detect a counterfeit media item containing a genuine wireless tag.

The fifth and sixth aspects of the invention associate a wireless tag to a media item by more than by just physical attachment. The tag on its own cannot be used to prove authenticity of a media item because it must match an encoded representation rendered on the media item.

According to a seventh aspect of the present invention there is provided a method of operating a self-service terminal storing a plurality of media items, each having a substrate incorporating a wireless tag, the method comprising: preparing media items for dispensing to a user; reading the wireless tags incorporated into the prepared media items; presenting the media items to a user for removal; in the event that the user does not remove the media items within a predetermined time period, retracting the presented media items; reading the wireless tags incorporated into the presented media items; and recording any discrepancy between the media items presented and the media items retracted.

According to an eighth aspect of the present invention there is provided a self-service terminal comprising a media dispenser including a presenter module for presenting a bunch of media items to a user; the terminal further comprising a wireless tag reader for reading media items when they are presented to a user and when they are retracted.

By virtue of the seventh and eighth aspects of the present invention, one type of fraud at an ATM is reduced. This fraud involves an ATM user requesting multiple notes in a dispense operation but taking only a percentage of those notes when they are presented. The result is that the ATM dispenser retracts the remaining notes and does not deduct funds from the user's account. However, the ATM cannot determine how many notes have been retracted. The seventh and eighth aspects of the invention solve this problem for banknotes and other media items that contain wireless tags by detecting the value of media containing wireless tags on the way out of, and retracted back into, an ATM. Hence any anomalies are readily detected by the ATM.

According to a ninth aspect of the present invention there is provided a self-service terminal including a media sensor for detecting multiple superimposed media items having a substrate incorporating a wireless tag, wherein the media sensor includes a wireless tag reader for reading the wireless tag in each media item.

According to a tenth aspect of the present invention there is provided a method of detecting multiple superimposed media items, each item having a wireless tag incorporated in a substrate, the method comprising: reading the wireless tags in the vicinity of the tag reader; and detecting the tags in the vicinity of the reader to determine how many media items are being transported.

By virtue of the ninth and tenth aspects of the invention a reliable and inexpensive media sensor is provided. Multiple superimposed media items may still be used to fulfil a transaction because the exact number of media items is easily determined. Only if more media items are being transported than are required to fulfil a transaction are the media items sent to a purge bin. For example, if two twenty dollar bills are transported and only a single twenty dollar bill is required to fulfil a transaction, then the two twenty dollar bills are sent to a purge bin. However, if three twenty dollar bills are required to fulfil a transaction then the two superimposed twenty dollar bills can be used, and a third twenty dollar bill can be picked from a currency dispenser to fulfil the transaction.

These aspects of the invention overcome a problem with dispensers in ATMs in which multiple notes are picked from a stack of stored notes instead of a single note. The systems used at present are capable of identifying singularity and non-singularity of notes. In the case of more than one note, that pick operation cannot be used as part of the requested transaction.

The ninth and tenth aspects of the invention have the advantage of simplicity and low cost. Furthermore, the physical characteristics of the media items do not affect the accuracy of the media detection process. Other solutions measure media thickness either directly or indirectly and are affected by wear, dirt, debris, attachments, holes, and such like.

According to an eleventh aspect of the invention there is provided a method of authenticating an item, such as a document, comprising: reading information printed or otherwise applied to a surface of the document; reading a wireless tag embedded in the document; comparing data retrieved from the wireless tag to data printed on the document to validate the accuracy of the data; and processing the document in the event that the printed data is consistent with the data read from the wireless tag.

Preferably, the wireless tag includes a digital signature to enable a reader to verify that the data has not been changed since it was written. This enables a terminal to validate that the information presented on a document (or other item) has not been tampered with. One example is a check. The person or machine that writes/prints the check also writes information into the wireless tag incorporated into the check and includes a signature. The information written into the tag may include payor details, payee details, the date the check was written, the expiry date of the check, the amount the check is made out for, and such like. If a third party alters the information written (or printed) on the check, for example, to change the payee or the amount, then the information written to the wireless tag will not match the information written on the check, so the check will not be processed.

By virtue of the eleventh aspect of the invention, it is possible to determine whether details printed on an item have been modified. If the stored information does not reflect information appearing on the document, then the information appearing on the document has been modified and may be unreliable.

The word "media" is used herein in a generic sense to denote one or more items, documents, or such like having a generally laminar sheet form; in particular, the word "media" when used herein does not necessarily relate exclusively to multiple items or documents. Thus, the word "media" may be used to refer to a single item (rather than using the word "medium") and/or to multiple items.

BRIEF DESCRIPTION OF THE DRAWINGS

These and other aspects of the invention will be apparent from the following specific description, given by way of example, with reference to the accompanying drawings.

DETAILED DESCRIPTION

Figure 1:
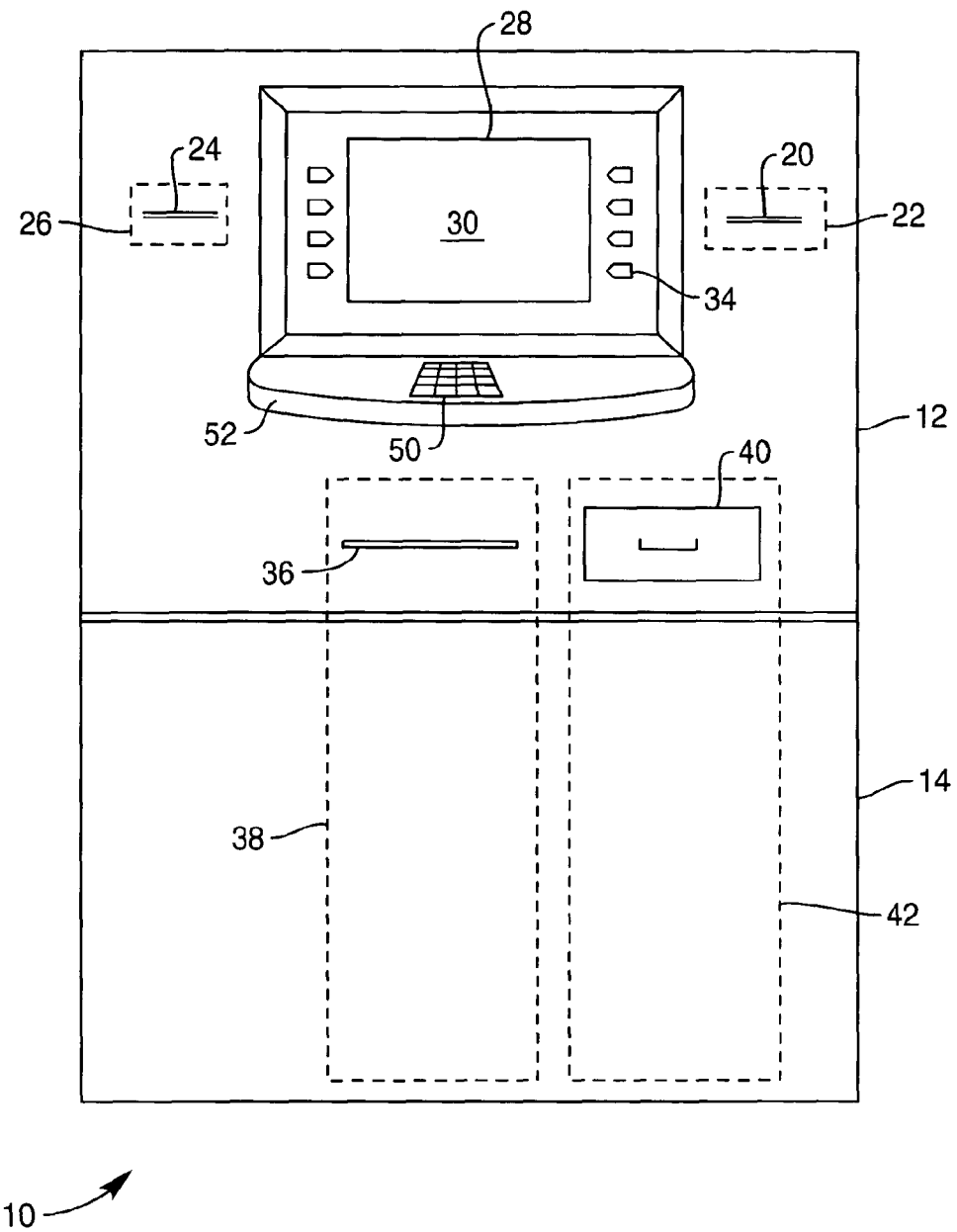
FIG. 1 is a simplified schematic front view of a self-service terminal according to a first embodiment of the present invention.

Reference is now made to FIG. 1, which shows a front-access self-service terminal 10 in the form of an automated teller machine (ATM) according to one embodiment of the invention. The terminal 10 has a chassis (not shown) to which is pivotably coupled a plastic fascia 12 covering an upper portion of the chassis (not shown). A door 14 is hingeably coupled to a lower portion of the chassis (not shown). When the fascia 12 is hinged open and the door 14 is swung open, an operator can gain access to modules located within the ATM 10.

The fascia 12 provides a user interface for allowing a user to interact with the ATM 10. In particular, the fascia 12 has apertures aligning with modules mounted in the chassis (not shown) when the fascia 12 is pivoted to the closed position. The fascia 12 defines: a card reader slot 20 aligning with a card reader module 22 mounted within the chassis (not shown); a receipt printer slot 24 aligning with a receipt printer module 26 mounted within the chassis (not shown); a display aperture 28 aligning with a display 30, and associated function display keys (FDKs) 34, the display being mounted as a module within the chassis (not shown) and the FDKs being mounted in the fascia 12; a dispenser slot 36 aligning with a dispenser module 38 mounted within a safe (not shown) in the chassis (not shown); and a deposit aperture 40 aligning with a deposit module 42 mounted within the safe (not shown) in the chassis.

The fascia 12 also includes an encrypting keypad 50 mounted on a shelf portion 52 extending outwardly from beneath the recessed display aperture 28.

Figure 2:
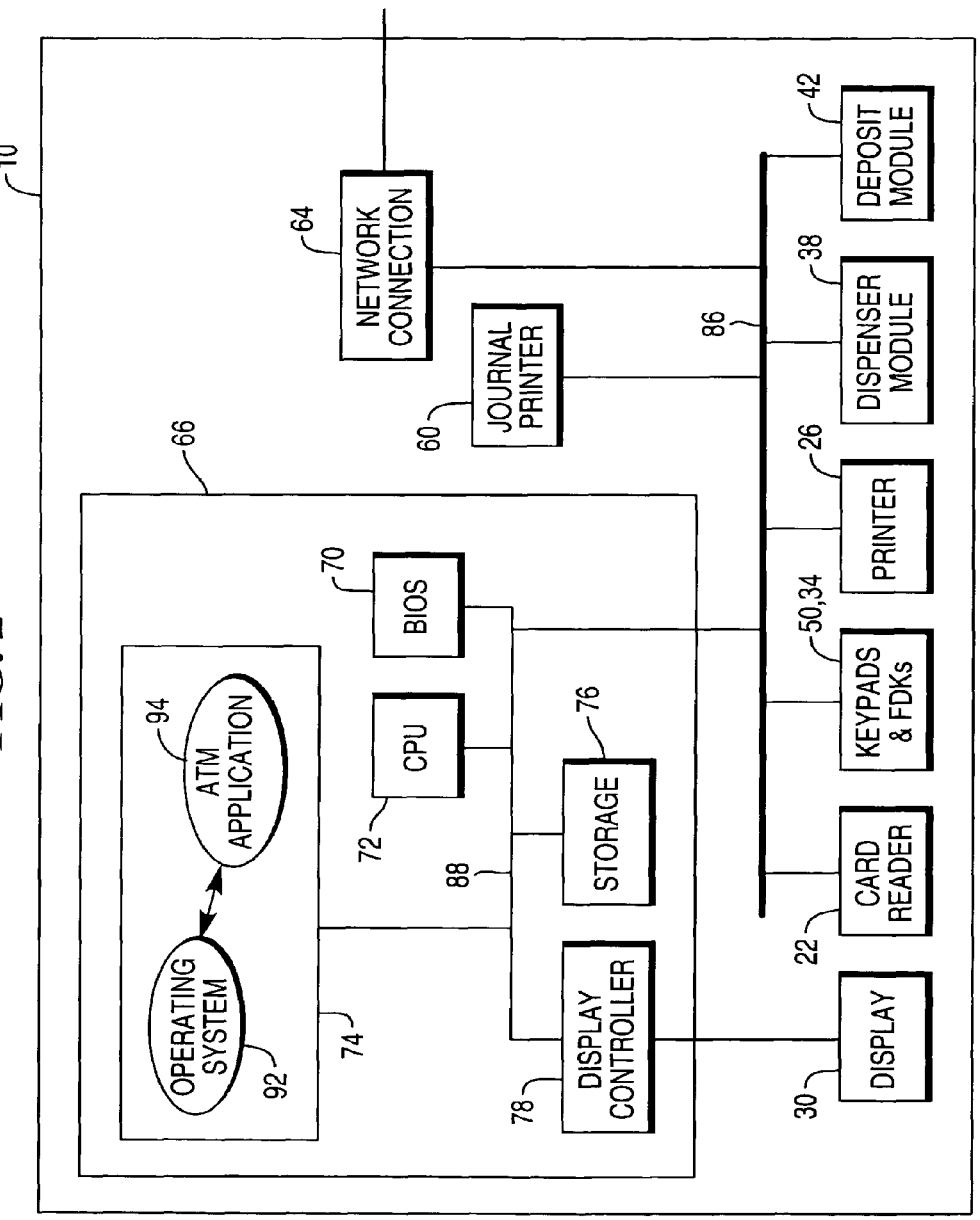
FIG. 2 is a block diagram of the terminal of FIG. 1.

Referring now to FIG. 2, the ATM 10 also includes a journal printer module 60 for creating a record of every transaction executed by the ATM 10, a network connection module 64 for accessing a remote authorization system (not shown), and a controller module 66 (in the form of a PC core) for controlling the operation of the ATM 10, including the operation of the modules.

The controller 66 comprises a BIOS 70 stored in non-volatile memory, a microprocessor 72, associated main memory 74, storage space 76 in the form of a magnetic disk drive, and a display controller 78 in the form of a graphics card.

The display module 30 is connected to the controller module 66 via the graphics card 78 installed in the controller module 66. The other ATM modules (22, 26, 34, 38, 42, and 50) are connected to the ATM controller 66 via a device bus 86 and one or more internal controller buses 88.

In use, the main memory 74 is loaded with an ATM operating system kernel 92, and an ATM application 94. As is well known in the art, the operating system kernel 92 is responsible for memory, process, task, and disk management. The ATM application 94 is responsible for controlling the operation of the ATM 10. In particular, the ATM application 94 provides the sequence of screens used in each transaction (referred to as the transaction flow); monitors the condition of each module within the ATM (state of health monitoring); and obtains authorization for transactions from a remote transaction authorization server (not shown).

The term "screen" is used herein to denote the graphics, text, controls (such as menu options), and such like, that are presented on an SST display; the term "screen" as used herein does not refer to the hardware (that is, the display 30) that presents the graphics, text, controls, and such like. Typically, when a transaction is being entered at an SST, a series of screens are presented in succession on the SST display, the next screen displayed being dependent on a user entry or activity relating to the current screen. For example, a first screen may request a user to insert a card; once a card has been inserted a second screen may invite the user to enter his/her PIN; once the final digit of the PIN has been entered, a third screen may invite the user to select a transaction; and so on.

Figure 3:
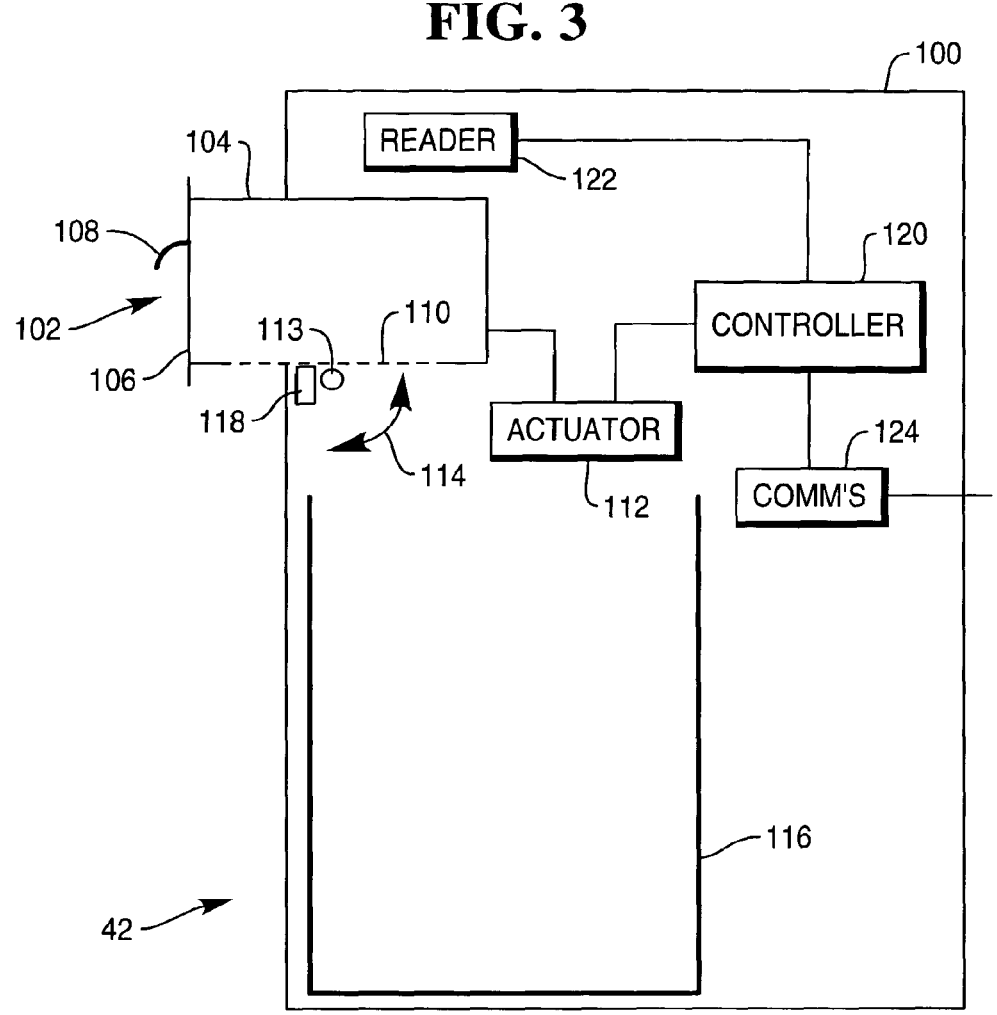
FIG. 3 is a simplified schematic side view of a depository module of the terminal of FIG. 1.

The deposit module 42 will now be described in more detail, with reference to FIG. 3 of the accompanying drawings.

The deposit module 42 comprises a module chassis 100 that is slideably mounted within the ATM chassis (not shown) to allow the deposit module 42 to be racked in and out of the ATM 10 for emptying, servicing, and such like operations.

The module chassis 100 defines an opening for a slideable drawer 102, which operates as a temporary storage area for deposited media items. The drawer 102 has a body 104 and an end plate 106 including a handle portion 108. The drawer 102 is mounted on tracks to allow it to slide in and out of the module chassis 100. When the fascia 12 is pivoted down into engagement with the ATM chassis (not shown), the end plate 106 is accessible through the fascia 12 to allow an ATM user to open then close the drawer 102 using handle portion 108.

The body 104 includes a pivoting trap door 110 (shown in chain line in FIG. 3 for clarity) extending across substantially all of the underside of the drawer 102. The trap door 110 is opened by an actuator 112 when the drawer 102 is closed; when the drawer 102 is opened, a guide wheel 113 mounted in the chassis 100 beneath the trap door 110 returns the trap door 110 to the closed position as the trap door 110 moves over the guide wheel 113. When the drawer 102 is even partially open, the guide wheel 113 prevents the trap door 110 from being forced open.

When opened by the actuator, the trap door 110 pivots (as shown by arrows 114) to allow any deposited media items stored in the drawer 102 to fall into a storage bin 116.

The actuator 112 controls a lock 118 for locking the drawer 102 in the closed position when a deposit transaction is not being performed.

The actuator 112 is coupled to, and operates in response to commands received from, a deposit module controller 120. The controller 120 controls all the functions of the deposit module 42 and is coupled to a wireless tag reader 122 mounted in the vicinity of the drawer 102, and a communications module 124 for communicating with the ATM controller 66 (FIG. 2).

Figure 4:
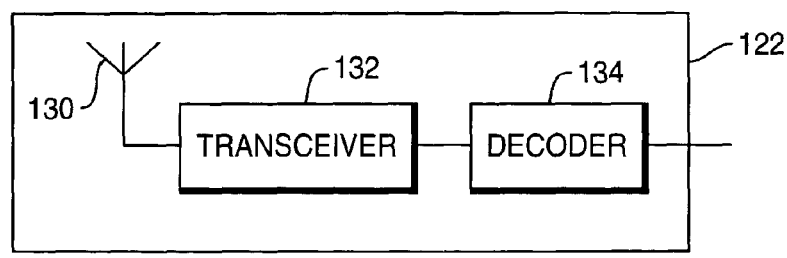
FIG. 4 is a simplified block diagram of a wireless tag reader of the module of FIG. 3.

The wireless tag reader 122 is an RFID reader, and is shown in more detail in FIG. 4.

Referring to FIG. 4, the reader 122 comprises three main components: an antenna 130 coupled to a transceiver 132, which in turn is coupled to a decoder 134. The antenna 130 transmits RF signals from the reader 122 to an RF tag. The transceiver 132 generates RF signals for sending to the antenna 130 and receives RF signals from the antenna 130. The decoder 134 decodes the received RF signals to a format that may be understood by the controller 120.

Suitable RFID tags and readers are available from Intermec Technologies Corporation, Headquarters, 6001—36th Avenue West, Everett, Wash. 98203-1264.

An overview of RFID technology can be found in "RFID Handbook, Radio-Frequency Identification Fundamentals and Applications", Klaus Finkenzeller, John Wiley & Son, Ltd. ISBN 0-471-98851-0.

Figure 5:
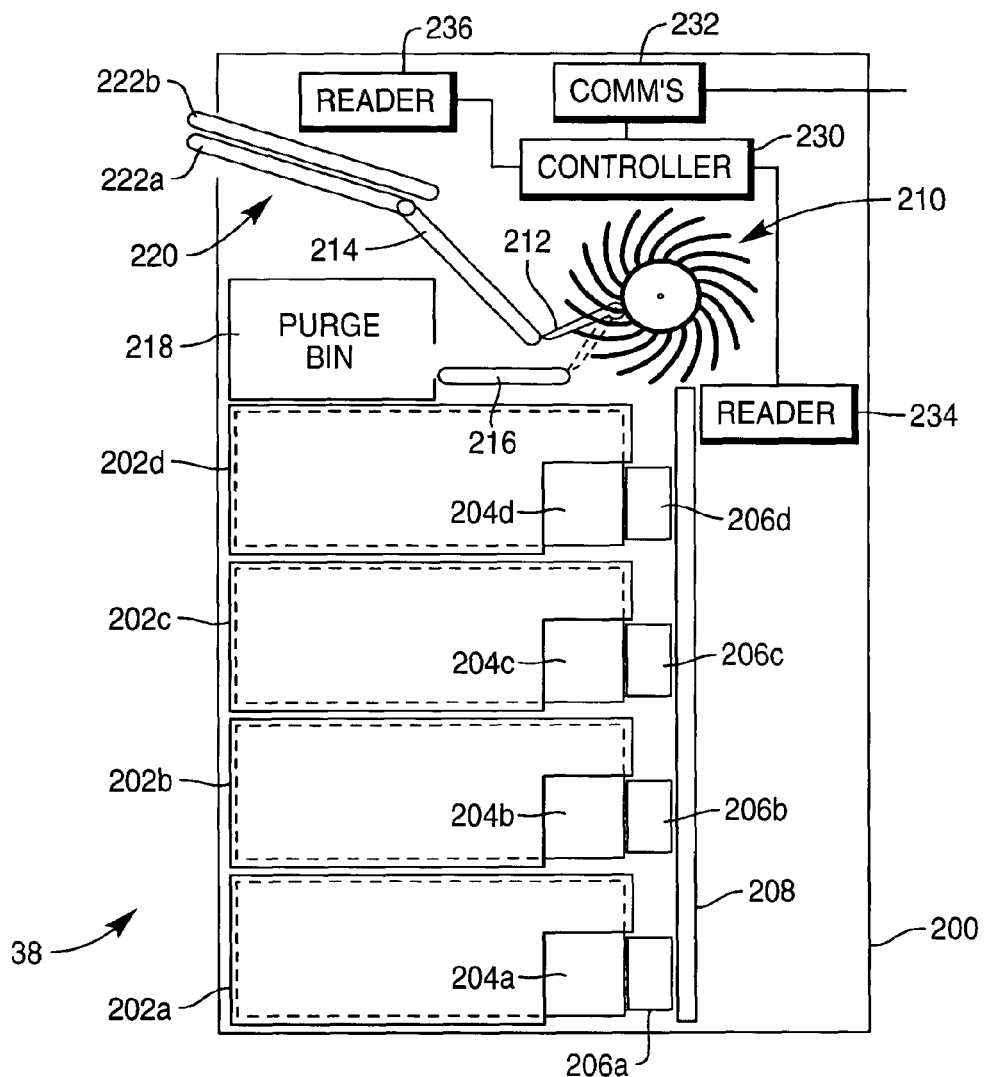
FIG. 5 is a simplified schematic side view of a dispenser module of the terminal of FIG. 1.

The dispenser module 38 will now be described in more detail, with reference to FIG. 5 of the accompanying drawings, which is a schematic side view of the dispenser module 38. In this embodiment, the dispenser module 38 is a front access cash dispenser module storing four removable currency cassettes mounted in vertical alignment.

The dispenser module 38 is typically located within a safe (not shown), inside the ATM 10, and comprises a dispenser chassis 200 having four currency cassette bays 202a to 202d, each bay 202 accommodates a removable currency cassette 204. Associated with each bay is a media pick unit 206 for removing media items one item at a time. In this embodiment, the media pick units 206 are vacuum operated pick units for removing banknotes from the currency cassettes 204. A media pick unit 206 picks a sheet from a currency cassette 204 and transfers the sheet to a transport mechanism 208, which transports the picked sheet to a stacking wheel 210.

In this embodiment, the transport mechanism 208 is in the form of a gear train, extending substantially vertically from the lowest currency cassette 204a to the stacking wheel 210, but any other convenient mechanism, such as stretchable endless belts, may be used.

A stacking wheel is well known in the currency dispenser art and so it is not illustrated in detail in the drawings. As is known to those of skill in the art, a stacking wheel comprises a plurality of stacking plates spaced apart in parallel relationship along a stacking wheel shaft, each stacking plate incorporates a series of curved tines. The tines of the stacking plates pass between portions of a rockably mounted stripper plate assembly 212 movable from a presenting position to a purging position as illustrated by the ghost outline in FIG. 5.

In operation, each banknote is fed by the transport mechanism 208 to the stacking wheel 210, enters between adjacent tines, and is carried partly around the axis of the stacking wheel 210. When the banknote reaches the stripper plate assembly 212, the assembly 212 removes the banknote from the stacking wheel 210. If the assembly 212 is in the presenting position (as shown by the solid lines in FIG. 5) then the banknote is placed on a presenting belt 214; whereas, if the assembly 212 is in the purging position (as shown by the ghost outline in FIG. 5) then the banknote is placed on a purge belt 216 for transporting into a purge bin 218.

The presenting belt 214 is part of a bunch presenter arrangement 220 that also includes a pair of co-operating belts 222a and 222b. When all banknotes that are to be dispensed to a user have been picked and placed in a stack on the presenting belt 214, the stack of banknotes is conveyed to the co-operating belts 222 for presenting to a user in bunch form. The co-operating belts 222 ensure that the stack of notes is transported in bunch form by applying pressure to the top and bottom banknote in the stack while the stack is being transported.

The dispenser module 38 also includes a dispenser module controller 230 for controlling the operation of the module. The dispenser controller 230 is coupled to a communications module 232 for communicating with the ATM controller 66 (FIG. 2), a multiple banknote sensor 234 in the form of a wireless RFID reader (identical to reader 122), and a banknote counting sensor 236 in the form of a wireless RFID reader (also identical to reader 122).

Figure 6:
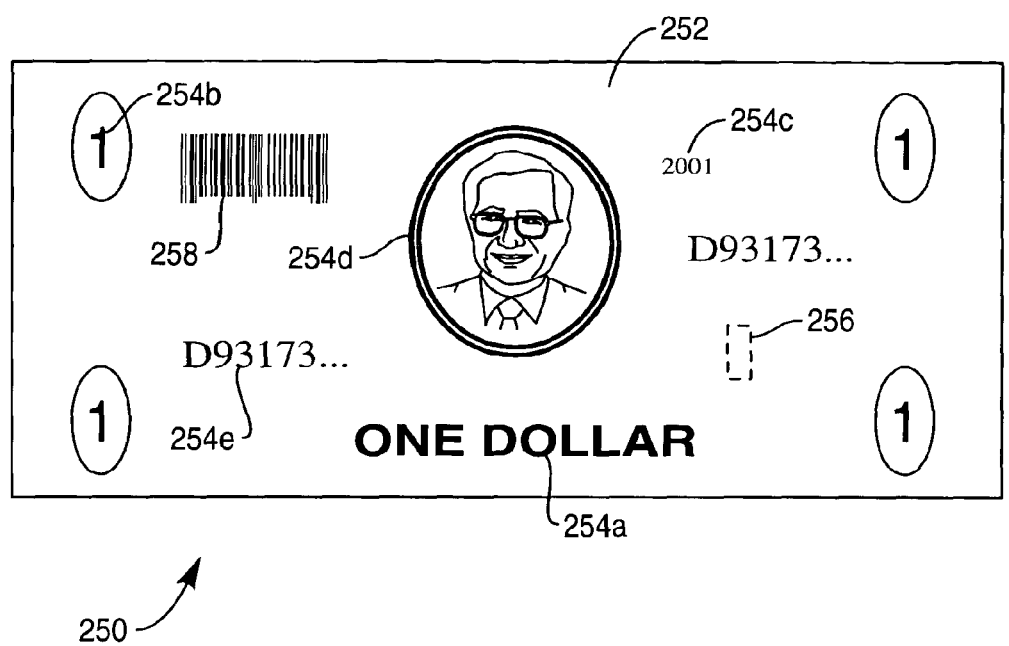
FIG. 6 is a pictorial view of a banknote incorporating a wireless tag for reading by the terminal of FIG. 1.

A typical banknote incorporating a wireless RFID tag is shown in FIG. 6. The banknote 250 includes a substrate 252 on which is printed banknote information 254 (for example, currency 254a, denomination 254b, issue date 254c, a graphical image 254d, a serial number 254e, and such like) and a wireless RFID tag 256 (shown in ghost outline) incorporated within the substrate 252. The substrate 252 may be rag-based, polymer, or any other convenient material, and includes security features (such as fluorescence features, watermarks, and such like) to aid validation of the banknote.

Each wireless RFID tag 256 includes a unique identification code so that it can be traced, in addition to details about the value of the banknote (for example, one dollar) and when the banknote was issued (for example, May 31, 2001). The banknote in FIG. 6 includes an encoded representation 258 of the unique identification code of the wireless tag 256 incorporated within the banknote 250. In this embodiment, the encoded representation is in the form of a bar-code printed with fluorescent ink.

Figure 7A:
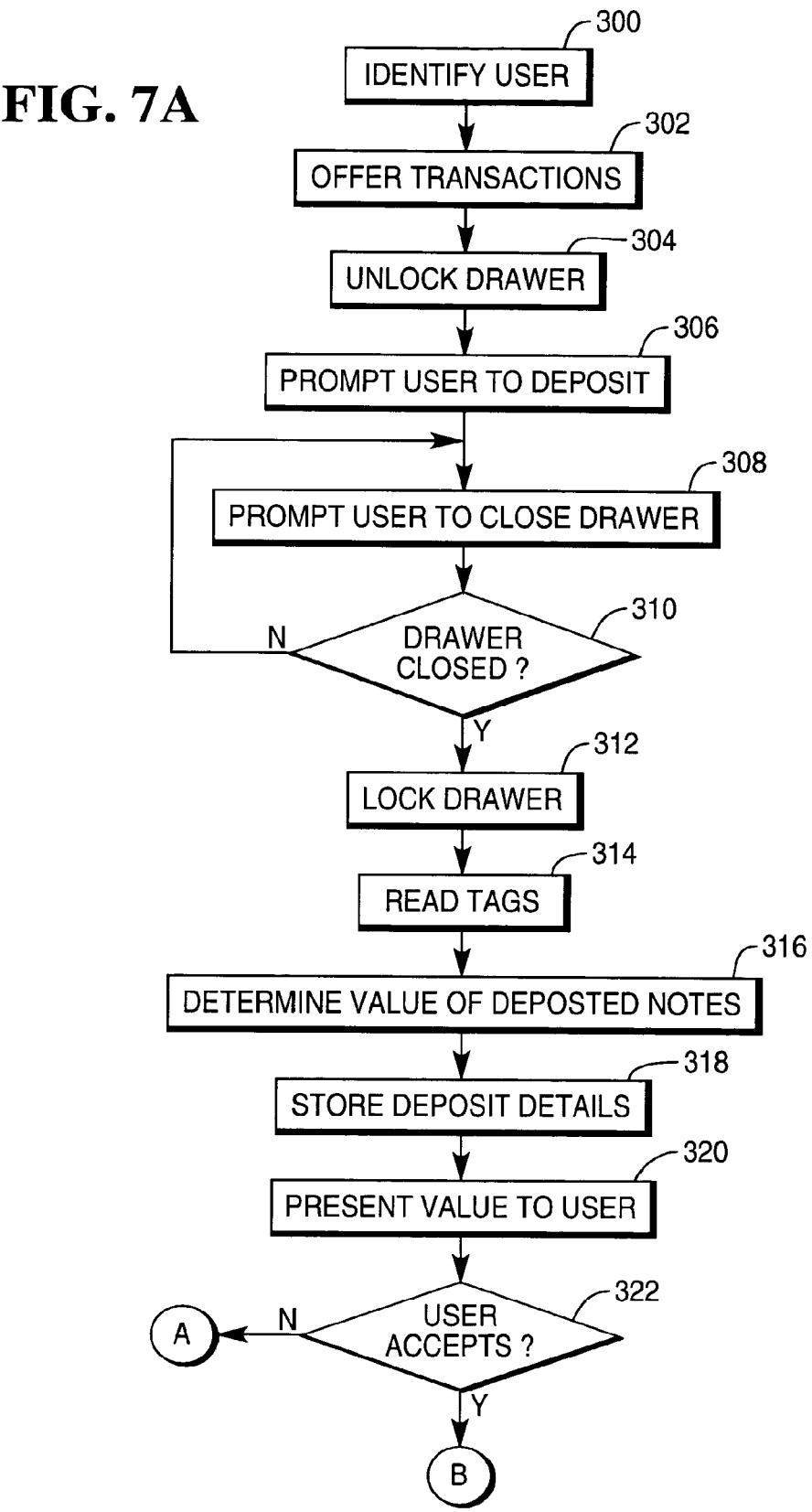
FIGS. 7A to 7C comprise a flowchart illustrating the steps involved in a typical deposit transaction.

A typical deposit transaction will now be described with reference to FIGS. 1 to 6, and also FIG. 7, which is a flowchart illustrating the steps involved in a typical deposit transaction.

Initially, a user provides the ATM 10 with identification data (step 300) by entering his card through the card reader slot 20 and typing in his personal identification number (PIN) in response to a request presented on the display 30.

The ATM 10 then presents the user with a list of transaction options (step 302). In this example, the user selects a deposit transaction.

The ATM 10 then unlocks the drawer 102 using ATM controller 66, deposit controller 120, and actuator 112 (step 304); and requests the user (via a screen presented on the display 30) to open the drawer and deposit one or more banknotes into the drawer 102 (step 306).

The ATM 10 then prompts the user to close the drawer 102 (step 308).

The actuator 112 senses if the drawer 102 is closed, using one or more microswitches (not shown) (step 310). If the drawer 102 is not closed, then the ATM 10 reverts to step 308 and prompts the user to close the drawer 102. If the drawer 102 is closed, then the ATM 10 locks the drawer (step 312) then reads the wireless tags in the drawer 102 (step 314) using the wireless RFID tag reader 122.

The wireless tag reader 122 reads all of the tags within the drawer 102. Thus, if five banknotes have been deposited by a user, the wireless tag reader 122 reads all five wireless tags. As each tag has a unique identification code, the reader 122 does not confuse the tags. Furthermore, as each tag includes details of the value of the banknote in which it is embedded, the total amount of money deposited is calculated by the controller 120 (step 316) by adding the values of the deposited banknotes. Furthermore, because the serial number of each banknote is stored in its wireless tag, the serial numbers of the deposited banknotes can be associated with the depositor's identity (for example, using the depositor's card number) and stored by the ATM 10 as deposit details (step 318) and/or printed by the journal printer module 60 in the event that the banknotes are subsequently determined to be counterfeit.

The value of the deposit is then presented to the user on the display 30 (step 320) and the user is prompted to accept or reject the transaction (step 322).

Figure 7B:
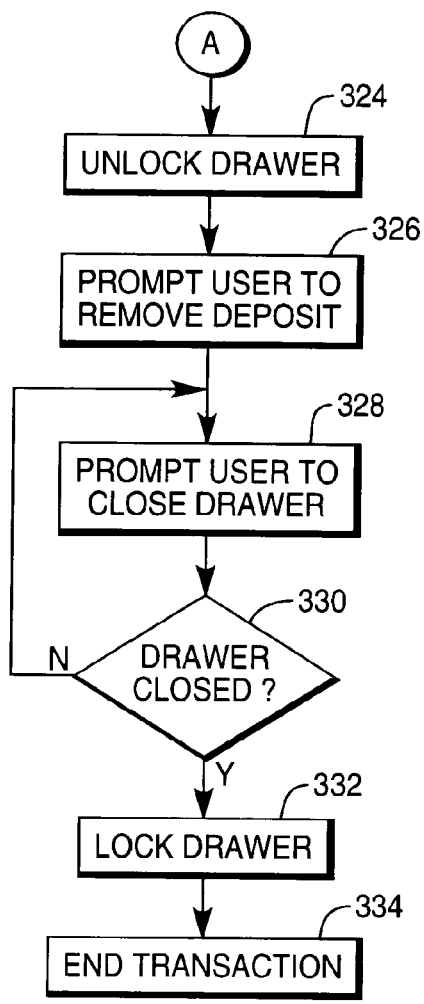

Referring to FIG. 7B, if the user rejects the deposit transaction, then the ATM 10 unlocks the drawer (step 324), prompts the user to remove the deposited banknotes (step 326), and then prompts the user to close the drawer 102 (step 328).

If the actuator 112 does not sense that the drawer 102 has been closed (step 330), then the ATM 10 reverts to step 328 and prompts the user to close the drawer 102. If the actuator 112 senses that the drawer 102 has been closed, then the actuator 112 locks the drawer (step 332) and ends the transaction by returning the user's card (step 334).

Figure 7C:
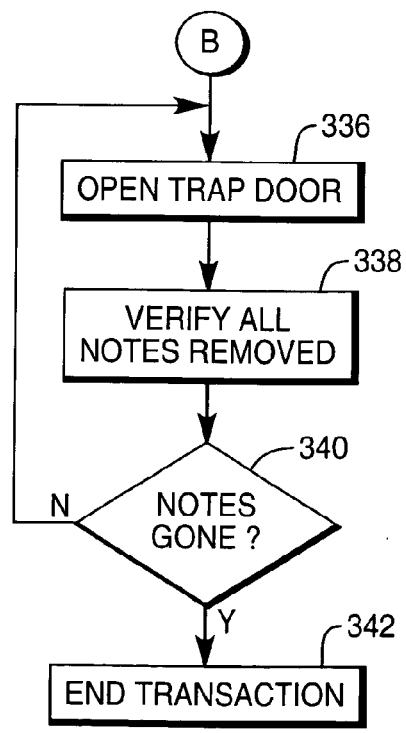

Referring to FIG. 7C, if the user accepts the deposit transaction (at step 320), then the actuator 112 opens the trap door 110 (step 336) to let the deposited banknotes fall into the storage bin 116. The reader 122 then reads any tags present in the drawer 102 to verify that all of the deposited banknotes have been moved to the storage bin 116 (step 338). If one or more tags is read (step 340), then the ATM 10 reverts to step 336, and the actuator 112 re-opens the trap door 110. If no tags are read (step 340), then the ATM 10 ends the transaction by returning the user's card (step 342).

Figure 8A:
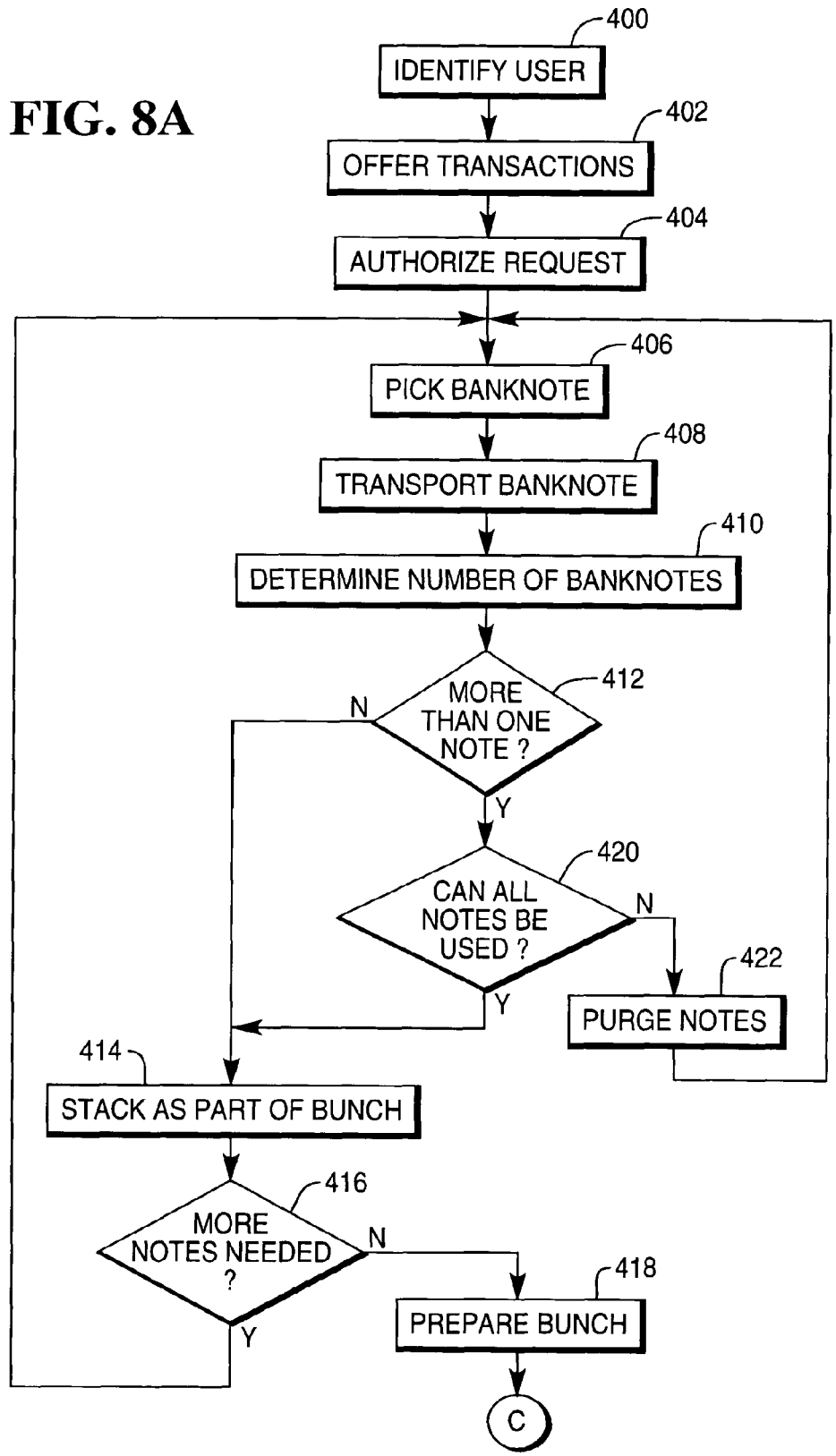
FIGS. 8A and 8B comprise a flowchart illustrating the steps involved in a typical dispense transaction.
Figure 8B:
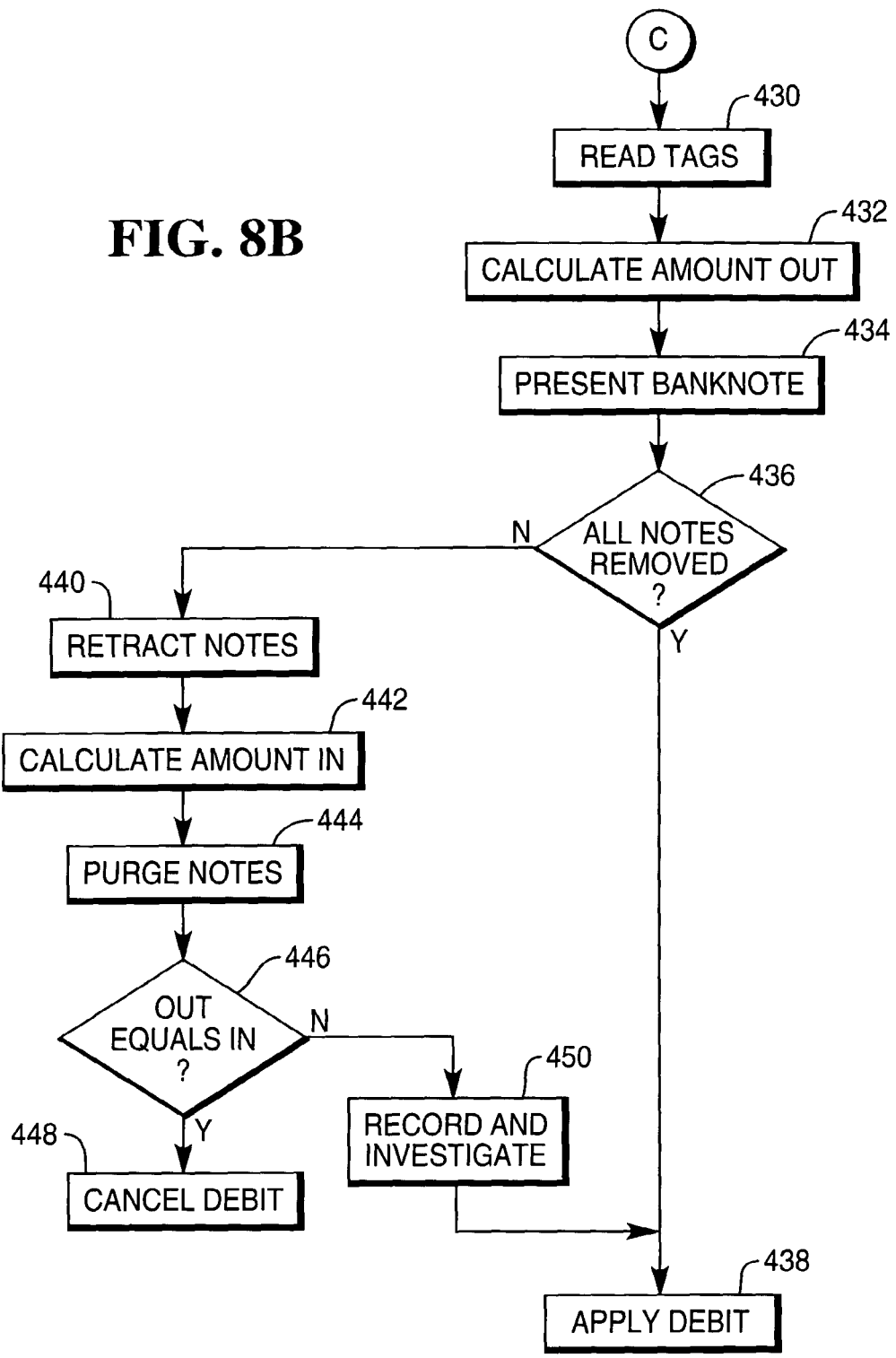
Figure 9A:
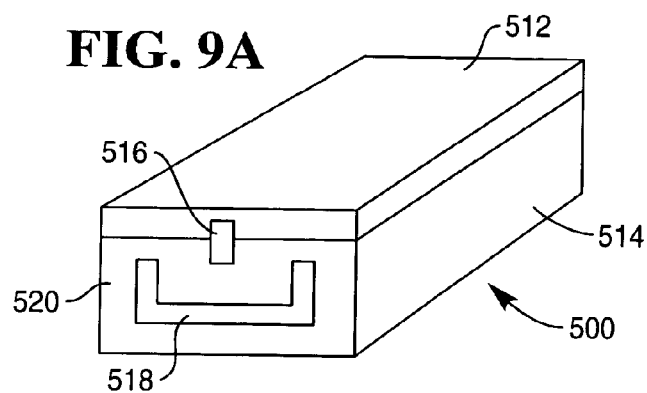
FIGS. 9A to 9D are schematic views of a media cassette for use in a self-service terminal according to another embodiment of the present invention.
Figure 9B:
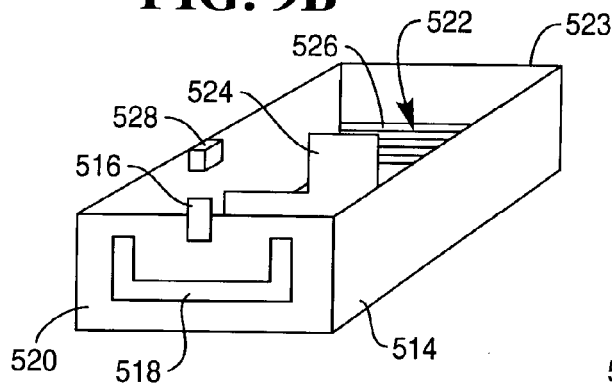
Figure 9C:
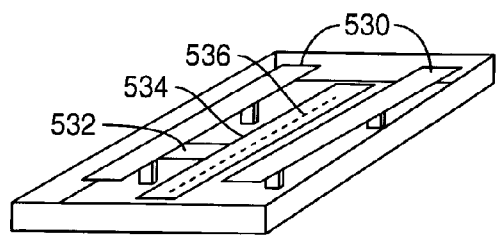
Figure 9D:
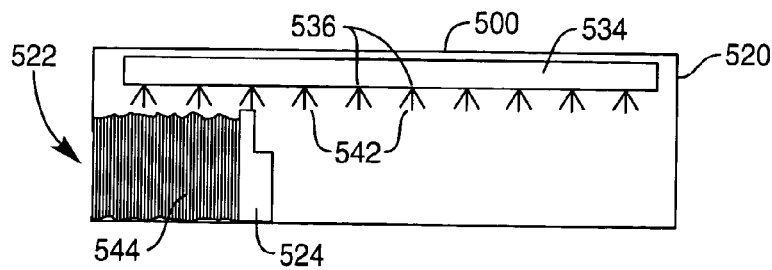

A typical banknote dispense transaction will now be described with reference to FIGS. 1 to 6, and also FIG. 8, which is a flowchart illustrating the steps involved in a typical banknote dispense transaction. For simplicity, some steps that are common to conventional ATMs have been omitted from this flowchart.

Initially, a user provides the ATM 10 with identification data (step 400) by entering his card through the card reader slot 20 and typing in his personal identification number (PIN) in response to a request presented via a screen on the display 30.

The ATM 10 then presents the user with a list of transaction options (step 402). In this example, the user selects a banknote dispense transaction.

The user enters the amount of money requested, in this example, one hundred dollars. The ATM 10 then checks to ensure that this amount can be supplied (for example, the requested amount may have to be a multiple of twenty dollars and less than four hundred dollars). Provided the ATM 10 can supply the requested amount, the ATM 10 then requests authorization for the transaction (step 404) from a remote authorization server (not shown).

If the authorization request is not successful, then the ATM proceeds in the same way as in conventional ATMs, for example, by requesting the user to re-enter his PIN if the PIN is not validated, or by informing the user that there is insufficient funds if the user has requested more money than is available to him.

If the authorization request is successful, then the dispenser 38 picks a banknote (which may be multiple banknotes superimposed on each other and transported as a single item) from one of the currency cassettes 204 (step 406). In this example, the banknote is a twenty dollar bill. The banknote (or superimposed notes) is then transported (step 408) from the pick unit 206 up the transport mechanism 208 and in front of the multiple banknote sensor 234.

The multiple banknote sensor 234 reads the tags present as the banknote (or superimposed notes) passes by (step 410). If more than one banknote is present, then the multiple banknote sensor 234 reads more than one tag. The sensor 234 can easily determine how many banknotes are being transported because each banknote has a unique identification code, so the value of the banknote(s) being transported can easily be determined by the sensor 234.

If only one banknote is being transported (step 412), then the banknote is transported into the stacking wheel 210 (step 414), and the dispenser 38 determines if more banknotes are needed to fulfil the user's request (step 416). In this example, the user has requested one hundred dollars and only a single twenty dollar bill has been picked, so the dispenser 38 reverts to step 406 and picks another banknote.

If no other banknotes are needed to fulfil the user's request then the note (or notes) in the stacking wheel 210 is removed by the stripping arrangement 212 and prepared for presenting to the user (step 418) as a bunch via the bunch note presenter 220 and the cash dispenser slot 36

Returning to step 412, if more than one banknote has been picked and transported as a single note, then the dispenser 38 determines if the notes being transported can be used to fulfil the user's request (step 420), for example, if the notes being transported amount to less than or the same amount as the remaining banknotes to be picked to fulfil the user's request.

If the transported multiple banknotes can be used then the dispenser 38 proceeds to step 414, where the notes are transported into the stacking wheel 210.

If the transported multiple banknotes cannot be used then the dispenser 38 purges the notes (step 422) by transporting the notes to the purge bin 218. The dispenser 38 then reverts to step 406 to pick another banknote.

Returning to step 418, and referring to FIG. 8B, when the dispenser 38 has prepared a bunch of notes for presenting to a user, then the banknote counting sensor 236 in the vicinity of the bunch presenter arrangement 220 reads the banknotes in the bunch (step 430), and calculates (step 432) the value of banknotes to be presented based on the tags read from the banknotes.

Provided the calculated value matches the value of banknotes requested by the user, the bunch of banknotes is then presented to the user (step 434). If the value of banknotes requested does not match the value of banknotes to be presented, then the bunch of banknotes may be transported to the purge bin 218, and a new bunch of banknotes prepared.

In the same manner as for a conventional dispenser, the dispenser 38 determines if the bunch of banknotes has been removed within a predetermined time period, for example, twenty seconds (step 436).

If the bunch of banknotes has been removed, then the ATM 10 notifies the remote server (not shown) that the dispense operation has been performed and that the user's account should be debited (step 438).

If the bunch of banknotes has not been removed, then the dispenser 38 retracts the bunch (step 440), and the banknote counting sensor 236 in the vicinity of the bunch presenter arrangement 220 reads the banknotes in the retracted bunch, and calculates (step 442) the value of banknotes retracted.

The dispenser 38 then transports the retracted bunch of banknotes to the purge bin 218 (step 444), and determines (step 446) whether the value of banknotes presented to the user in step 432 equals the value of banknotes retracted in step 442.

If the two amounts are equal, then all of the presented banknotes have been retracted, so the user's account is not debited.

If the two amounts are not equal (that is, if the value of banknotes presented to the user exceeds the value of banknotes retracted from the user), then not all of the presented banknotes have been retracted. In such an event, the user's account number is recorded (step 450), together with the identification code from any wireless tag which is not present in the retracted banknotes but was present in the presented notes. The dispenser 38 informs the ATM 10 that the transaction should be investigated, and the user's account is debited (step 438) for either the full amount or the amount of money that was presented but not retracted.

Reference is now made to FIGS. 9A to 9D, which illustrate a currency cassette 500 for use in a valuable media protection system. The cassette 500 is in the form of a polycarbonate currency cassette for storing banknotes, and has a lid 512 secured to a body 514 by a latch 516. The body 514 has a handle 518 at a handle end 520, and a pick area 522 at the opposite end 523. Mounted on a ratchet within the body 514 is a biased note guide 524 that urges banknotes towards the pick area 522. The body 514 has a roller shutter 526 covering the pick area 522, so that when the cassette 500 is inserted into an ATM (such as ATM 10), tines in the ATM engage with recesses (not shown) in the body 514, and the roller shutter 526 is automatically raised by the tines to allow banknotes to be picked from the pick area 522. The body 514 also has a resin transfer channel 528 for conveying quick-setting resin from an external cartridge (not shown), typically located in an ATM's pick module, into the lid 512. In this embodiment, the quick-setting resin is an epoxy resin.

The underside of the lid 512 includes two banknote aligners 530 that prevent banknotes stored within the cassette 500 from moving towards the lid 512 during transportation. The underside of the lid 512 also includes a resin transfer channel 532 and a spray bar 534 having a plurality of apertures 536 for spraying resin into the body 514. The transfer channels 528, 532 and the spray bar 534 comprise a conventional fluid spray system.

As is known in the art, if an ATM in which the cassette is mounted is tampered with, the fluid spray system is activated, spraying resin 542 from the apertures 536 and thereby bonding the banknotes in the cassette 500 into a single block 544.

The cassette 500 may also be used with a monitoring system located in a cash-in-transit vehicle, and a monitoring system located in a hand-carrying case, so that the cassette is always protected, whether it is transported by vehicle, by hand, or mounted in an ATM.

As is known in the art, an ATM in which the cassette 500 is mounted may initiate a connection to a remote center (not shown) if the ATM is tampered with.

The cassette 500 has the advantage that it is not necessary to separate the bonded banknotes to be able to prove the value of the notes, because the tags incorporated into the bonded banknotes can be read to prove the value of the bonded notes. This is in contrast to previous systems that used glue to bond banknotes, but which required the banknotes to be separated to access the serial number from each note so that the banknotes could be exchanged.

Figure 10:
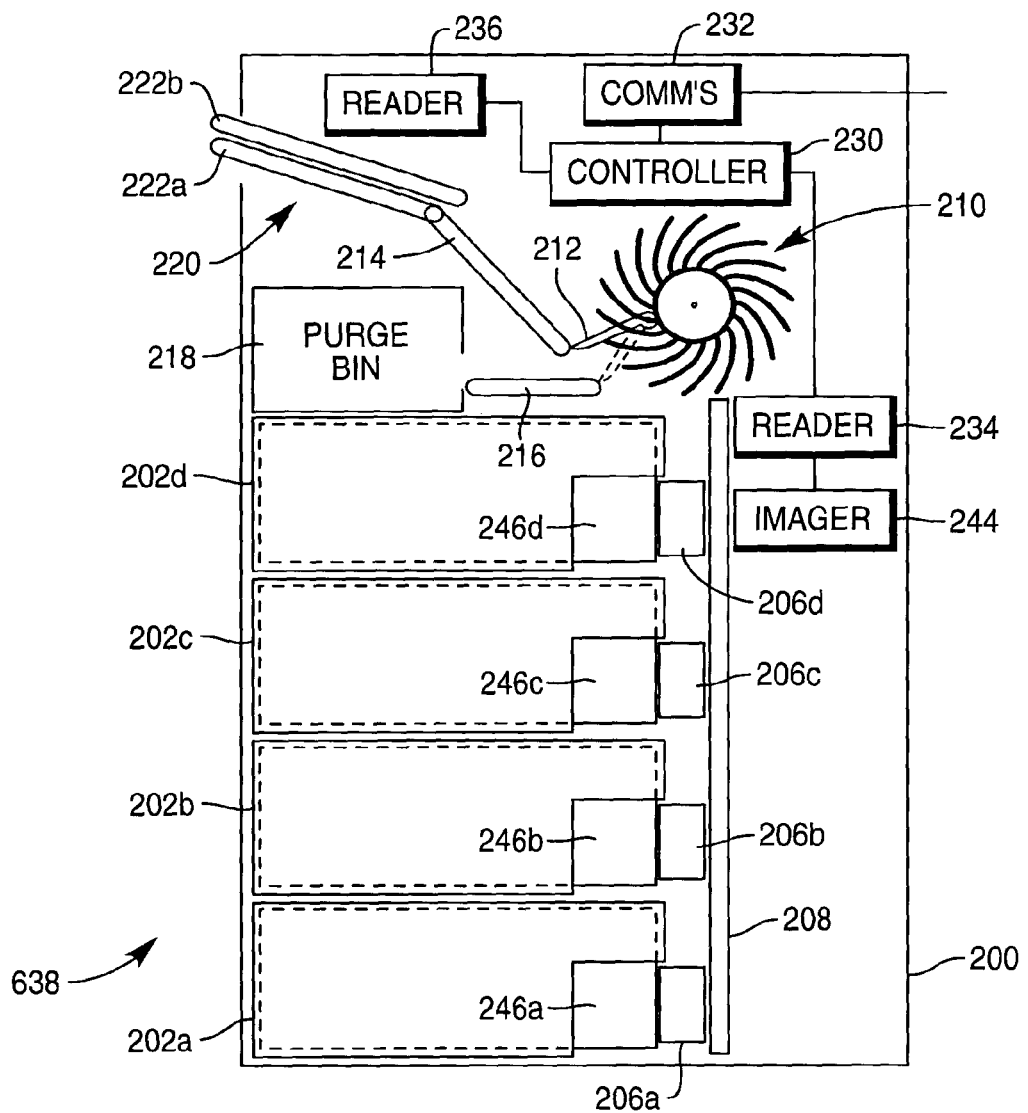
FIG. 10 is a simplified schematic side view of an alternative dispenser module to that of FIG. 5.

Reference is now made to FIG. 10, which illustrates a dispenser 638 according to another embodiment of the present invention. The dispenser 638 is very similar to dispenser 38 of FIG. 5; the main differences are that the dispenser 638 includes an imager 244, and that the cassettes 246 contain pre-printed sheets having wireless tags that are programmable by the dispenser 638.

In operation, dispenser 638 images a sheet after it is picked from a cassette 246 to determine the value of the sheet or to read a unique code from the sheet (either printed or otherwise incorporated into a substrate of the sheet). The banknote sensor 234 encodes the read information into a wireless tag embedded into the picked sheet. Thus, at the time a sheet is dispensed, value may be added to the sheet.

Various modifications may be made to the above embodiments within the scope of the present invention. For example, in the deposit module, the temporary storage facility may not be a drawer, but may be a compartment having a different form, such as a pivoting compartment. In other embodiments, the reader may be located within the temporary storage facility. In other embodiments, the temporary storage facility may include a further emptying mechanism in addition to the trap door, such as an air blower or a moving arm, to dislodge any media items that have become stuck in the temporary storage facility. In other embodiments, the deposit module may receive media items other than banknotes, for example, checks, payment sheets, or such like.

In other embodiments a different manner of identifying a user may be employed, for example, a biometric identification system may be used. Suitable biometric systems include facial recognition, iris recognition, fingerprint recognition, voice recognition, vein pattern recognition, hand geometry recognition, and such like.

In other embodiments, the dispenser may dispense valuable media other than banknotes, for example, stamps, ski passes, tickets, and such like.

In other embodiments, the user may be provided with a receipt from the receipt printer 26, where the receipt includes information retrieved from the wireless tags incorporated in deposited media items.

In other embodiments the imager may be provided in a depository module so that a deposited document, such as a check, can be imaged and read using optical character recognition (OCR). The document's wireless tag can be read and any signature can be decrypted and the stored information hashed to ensure that it has not been altered. If the stored information has not been altered and it matches information read from the document using OCR, then the check can be processed, either deposited or cashed. If the stored information does not match the OCR information, then the check may be returned to the user, or retained by the ATM. The check would not be cashed and the user's account would not be credited.

What is claimed is:

1. An automated teller machine (ATM) comprising:
   a banknote store arranged to store banknotes deposited by an ATM customer;
   a banknote transport path coupling the banknote store and a deposit aperture through which banknotes are deposited;
   a transport mechanism transporting deposited banknotes along the banknote transport path from the deposit aperture to the banknote store;
   a wireless tag reader disposed internally within the ATM and arranged along the banknote transport path and wirelessly reading a unique serial number associated with each banknote being transported along the banknote transport path from the deposit aperture to the banknote store; and
   a controller storing deposit information including both ATM customer information and the unique serial number of each banknote deposited so that a particular banknote can be identified and associated with the ATM customer if the particular banknote is subsequently identified as being counterfeit based upon the stored deposit information.

2. The automated teller machine (ATM) of claim 1 further comprising:
   a bunch banknote dispenser to dispense banknotes in a bunch; and
   a second wireless tag reader arranged adjacent the bunch banknote dispenser and reading value information from multiple banknotes in the bunch.

3. The automated teller machine (ATM) of claim 2, wherein the controller determines a total value for the bunch from the read value information from the second wireless tag reader and compares the total value with a withdrawal amount requested by the ATM customer.

4. The automated teller machine (ATM) of claim 2, further comprising:
   a picker mechanism for picking a banknote from a supply of banknotes to be dispensed and feeding the banknotes to the bunch banknote dispenser; and
   a third wireless tag reader arranged to read information from any banknote picked by the picker mechanism to confirm only a single banknote has been picked.

5. The automated teller machine (ATM) of claim 1, wherein the wireless tag reader also reads value information for each banknote and a date of issue for the banknote; and
   the controller stores the value information and the date of issue along with the unique serial number in a transaction record.

6. The automated teller machine (ATM) of claim 1, wherein multiple banknotes are deposited by the ATM customer in a bunch; and
   the wireless tag reader reads the unique serial number associated with each banknote of the bunch.

7. The automated teller machine (ATM) of claim 6, wherein the banknote transport path comprises a banknote drawer that slides open to receive a bunch of banknotes.

8. The automated teller machine (ATM) of claim 7, wherein the banknote drawer is locked upon fully closing, a value for the bunch of banknotes inserted therein is determined and displayed to the customer who can then confirm or cancel the transaction.

9. The automated teller machine (ATM) of claim 8, further comprising:
   a receipt printer for printing a receipt including information retrieved from the wireless tags on the bunch of banknotes.

10. The automated teller machine (ATM) of claim 8, wherein upon confirmation of the transaction, the banknotes travel from the banknote drawer to the banknote store; and
   the wireless tag reader is utilized to deter mine the banknote drawer is empty.

11. A method of operating an automated teller machine (ATM), the method comprising:
   wirelessly reading a unique serial number associated with each banknote deposited by an ATM customer utilizing a wireless tag reader disposed within the ATM and arranged along a banknote transport path; and
   storing deposit information including both ATM customer information and the unique serial number of each banknote deposited by the ATM customer so that a particular banknote is identified and associated with the particular ATM customer if the particular banknote is subsequently identified as being counterfeit based upon the stored deposit information.

12. The method of operating the automated teller machine (ATM) of claim 11 further comprising:
   dispensing banknotes in a bunch from a bunch banknote dispenser; and
   reading value information from multiple banknotes in the bunch utilizing a second wireless tag reader arranged adjacent the bunch banknote dispenser.

13. The method of operating the automated teller machine (ATM) of claim 12, wherein the controller determines a total value for the bunch from the read value information from the second wireless tag reader and compares the total value with a withdrawal amount requested by the ATM customer.

14. The method of operating the automated teller machine (ATM) of claim 12, further comprising:
   picking a banknote from a supply of banknotes to be dispensed utilizing a picker mechanism;
   feeding the banknotes to the bunch banknote dispenser; and
   reading information from any banknote picked by the picker mechanism to confirm only a single banknote has been picked utilizing a third wireless tag reader.

15. The method of operating the automated teller machine (ATM) of claim 11, wherein the wireless tag reader also reads value information for each banknote and a date of issue for the banknote; and
   storing the value information and the date of issue along with the unique serial number in a transaction record.

16. The method of operating the automated teller machine (ATM) of claim 11, wherein multiple banknotes are deposited by the ATM customer in a bunch; and
   wirelessly reading the unique serial number associated with each banknote of the bunch.

17. The method of operating the automated teller machine (ATM) of claim 16, wherein the banknote transport path comprises a banknote drawer that slides open to receive a bunch of banknotes.

18. The method of operating the automated teller machine (ATM) of claim 17, further comprising:
   locking the banknote drawer upon fully closing;
   determining a value for the bunch of banknotes inserted therein; and
   displaying to the customer the value whereby the customer can then confirm or cancel the transaction.

19. The method of operating the automated teller machine (ATM) of claim 18, further comprising:
   printing a receipt including information returned from the wireless tags on the bunch of banknotes utilizing a receipt printer.

20. The method of operating the automated teller machine (ATM) of claim 18, wherein upon confirmation of the transaction, the banknotes travel from the banknote drawer to the banknote store; and
   determining the banknote drawer is empty utilizing a wireless tag reader.

* * * * *